UNITED STATES PATENT OFFICE.

LUDWIG TAUB, OF ELBERFELD, GERMANY, ASSIGNOR TO FARBENFABRIKEN VORM. FRIEDR. BAYER & CO., OF ELBERFELD, GERMANY, A CORPORATION OF GERMANY.

2-PHENYLQUINOLIN-4-CARBOXYLIC-ACID ESTER.

1,022,444.      Specification of Letters Patent.      Patented Apr. 9, 1912.

No Drawing.      Application filed December 16, 1911. Serial No. 666,213.

*To all whom it may concern:*

Be it known that I, LUDWIG TAUB, doctor of philosophy, chemist, citizen of the German Empire, residing at Elberfeld, Germany, have invented new and useful Improvements in 2-Phenylquinolin-4-Carboxylic-Acid Esters, of which the following is a specification.

My invention relates to the manufacture and production of the ethyl ester of 2-phenyl-quinolin-4-carboxylic acid having most probably the formula:

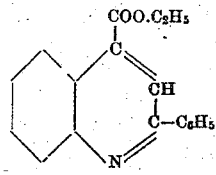

which has proved to be a valuable remedy against gout, an average single dose being ½ gram. It crystallizes from alcohol in the shape of whitish tasteless prisms melting at 61–62° C. It is soluble in organic solvents and forms salts with acids.

The product can be obtained by esterification of the 2-phenylquinolin-4-carboxylic acid. The following example may illustrate the process, the parts being by weight:—In a vessel provided with a reflux condenser 249 parts of 2-phenylquinolin-4-carboxylic acid are heated to boiling during 6–8 hours with ten times its quantity of a concentrated solution of hydrochloric acid in ethyl alcohol. The alcohol is distilled off and the oily residue is washed until neutral with water and a dilute sodium carbonate solution.

I claim:—

The herein described ethyl ester of 2-phenylquinolin-4-carboxylic acid crystallizing from alcohol in whitish tasteless prisms melting at 61–62° C.; being soluble in organic solvents; forming salts with acids; and being a remedy against gout, substantially as described.

In testimony whereof I have hereunto set my hand in the presence of two subscribing witnesses.

LUDWIG TAUB. [L. S.]

Witnesses:
   HELEN NUFER,
   A. NUFER.